United States Patent
Wildhagen

(10) Patent No.: US 6,738,610 B1
(45) Date of Patent: May 18, 2004

(54) DETECTION OF NOISE IN A FREQUENCY DEMODULATED FM-AUDIO BROADCAST SIGNAL

(75) Inventor: Jens Wildhagen, Weinstadt (DE)

(73) Assignee: Sony International (Europe) GmbH, Berlin (DE)

( * ) Notice: Subject to any disclaimer, the term of this patent is extended or adjusted under 35 U.S.C. 154(b) by 474 days.

(21) Appl. No.: 09/653,050

(22) Filed: Sep. 1, 2000

(30) Foreign Application Priority Data

Sep. 3, 1999 (EP) .............................. 99117372

(51) Int. Cl.[7] ................................ H04B 1/10
(52) U.S. Cl. ............... 455/296; 455/226.3; 455/310
(58) Field of Search ................... 455/296, 293, 455/295, 309, 312, 108, 205, 226.3, 310; 381/2, 3, 13

(56) References Cited

U.S. PATENT DOCUMENTS 5,222,252 A    6/1993   Kaesser ................ 455/67.3
5,410,751 A    4/1995   Yokoyama ............... 455/212

*Primary Examiner*—Quochien B. Vuong
*Assistant Examiner*—Thuan T. Nguyen
(74) *Attorney, Agent, or Firm*—Frommer Lawrence & Haug LLP; William S. Frommer; Bruno Polito

(57) ABSTRACT

The noise in a frequency demodulated audio signal is detected on the basis of the characteristics of the stereo-multiplex signal to obtain a very reliable information that can be used for the sliding stereo-mono transition, noise blanking and a de-noising of the stereo difference signal. A noise ($v_{d,q}(t)$) is calculated by performing a coherent amplitude demodulation of the frequency demodulated stereo-multiplex signal with the second harmonic of the pilot carrier that is quadrature to the pilot carrier and as a direct measure for the quality of the signal generating the variance ($\sigma^2 v_{d,q}$) of the noise signal by squaring and thereafter averaging the noise signal.

10 Claims, 2 Drawing Sheets

DETECTION OF NOISE IN A FREQUENCY DEMODULATED FM-AUDIO BROADCAST SIGNAL

BACKGROUND OF THE INVENTION

The present invention relates to the generation of a signal that is proportional to the noise included in an audio signal transmitted as frequency modulated stereo-multiplex signal. In fm-broadcasting a stereo-multiplex signal is frequency modulated. The stereo-multiplex signal consists of a stereo-sum signal and a stereo-difference signal. The stereo-difference signal is amplitude modulated with suppressed carrier. To allow a coherent amplitude demodulation of the stereo-difference signal at the receiver, a pilot carrier with half the AM-carrier frequency is added to the stereo-multiplex signal.

The stereo-sum signal and the stereo-difference signal are defined by $$m_s(t) = a_l(t) + a_r(t)$$

$$m_d(t) = a_l(t) - a_r(t)$$

The stereo-multiplex signal is defined by $$m_{stmux}(t) = m_s(t) + \sin(2\omega_{pil} t) \cdot m_d(t) + A_{pil} \sin(\omega_{pil} t)$$

The stereo-multiplex signal is frequency modulated:

$$S_{FM}(t) = A_{FM} \cos\left(\omega_c(t) + \Delta\omega \int_{-\infty}^{t} m_{stmux}(\tau) d\tau\right)$$

with $\omega_c$: carrier frequency $\Delta\omega$: frequency deviation

At the receiver side the frequency modulated stereo-multiplex signal is frequency demodulated and stereo-demultiplexed to calculate the left and right audio signal.

For the stereo demultiplexing, the stereo demultiplexer needs to recover the 2nd harmonic of the pilot carrier. Therefore, a PLL locks to the pilot carrier and generates the 2nd harmonic of the pilot carrier. The 2nd harmonic, that is locked in phase to the pilot carrier is needed for the coherent amplitude demodulation of the stereo-difference signal.

FIG. 2 shows the basic functionality of a state of the art stereo-demultiplexer. For the sake of simplicity the noise $n_b(t)$ added to the frequency modulated stereo-multiplex signal $S_{FM}(t)$ on the transmitter side, the receiver side and within the transmission channel is shown to be added to the frequency modulated stereo-multiplex signal $S_{FM}(t)$ by way of an adder 10 just before the frequency demodulator 11 of the stereo-demultiplexer shown in FIG. 2. Therefore, the frequency demodulator 11 outputs a stereo-multiplex signal u(t) that consists of the stereo-multiplex signal $m_{stmux}(t)$ as generated on the transmitter side and additionally an added noise component v(t) that is the frequency demodulated noise signal $n_b(t)$. On basis of this stereo-multiplex signal u(t) a PLL-circuit 2 generates the 2nd harmonic of the pilot carrier, i.e. a signal $2 \cdot \sin(2\omega_{pil} t)$, which is needed for the coherent amplitude demodulation of the stereo-multiplex signal u(t) to gain the stereo-difference signal $u_d(t)$. This coherent amplitude demodulation is performed by way of a demodulator 12 which receives the stereo-multiplex signal u(t) at its first input and the 2nd harmonic of the pilot carrier at its second input. The output signal of the demodulator 12 is input to a filter 9 which outputs the stereo-difference signal $u_d(t)$ that consists of the stereo-difference signal $m_d(t)$ generated at the transmitter side plus an additional noise component $v_d(t)$. A stereo-sum signal $u_s(t)$ comprising the stereo-sum signal $m_s(t)$ plus an additional noise component $v_s(t)$ is generated by a lowpass filtering of the stereo-multiplex signal u(t) with a lowpass filter 8 that receives the output signal of the frequency demodulator 11. The left audio signal is calculated by an addition of the stereo-sum signal $u_s(t)$ and the stereo-difference signal $u_d(t)$. The right audio signal r(t) is calculated by a subtraction of the stereo-difference signal $u_d(t)$ from the stereo-sum signal $u_s(t)$. The left output channel consists of the left audio signal l(t) and a noise component $v_d(t) + v_s(t)$ and the right audio channel consists of the right audio signal r(t) and a noise component $v_s(t) - v_d(t)$.

Therefore, without consideration of the noise $n_b(t)$ introduced in the transmission chain, the stereo-sum signal $m_s(t)$ is generated by a lowpass filtering of the stereo-multiplex signal and the stereo-difference signal is generated by a coherent amplitude demodulation of the amplitude modulated stereo-difference signal. The left and right audio signals l(t) and r(t) are calculated by addition and subtraction of the stereo-sum signal and the stereo-difference signal:

$$r(t) = m_s(t) - m_d(t) = (a_l(t) + a_r(t)) - (a_l(t) - a_r(t)) = 2a_r(t)$$

$$l(t) = m_s(t) + m_d(t) = (a_l(t) + a_r(t)) + (a_l(t) - a_r(t)) = 2a_l(t)$$

The detection of noise in a frequency demodulated signal is very important in the receiver. Depending on the noise level, the receiver switches from stereo-detection to mono-detection. In current car receivers the noise detection is done by analyzing the reception fieldstrength. In an optimal reception situation (only Gaussian noise, one path channel), the noise detection by analyzing the fieldstrength is reliable. If the fm-signal is received by an active antenna, the noise detection by analyzing the reception fieldstrength is not possible without knowing the characteristics of the active antenna. In case of multipath reception the detection of noise in the audio signal by analyzing the fieldstrength is very unreliable. Therefore, most of todays portable receivers include a multipath detection circuit, which is based on the detection of an amplitude modulation of the frequency modulated RF-signal. This kind of multipath detection is unreliable, especially the calculation of noise in the frequency demodulated audio signal is very unreliable. The third kind of noise in an audio signal, noise peaks, generated for example by sparks are detected in most of todays portable receivers by a highpass filtering of the frequency demodulated signal. This kind of noise peak detection is also unreliable.

BRIEF SUMMARY OF THE INVENTION

Therefore, it is object of the present invention to calculate a reliable information of the noise power in the audio signal.

This object is solved by a method to generate a signal that is proportional to the noise included in an audio signal transmitted as frequency modulated stereo-multiplex signal according to independent claim 1, a stereo-demultiplexer according to independent claim 5 and a noise indication circuit that generates a signal that is proportional to the noise included in an audio signal transmitted as frequency modulated stereo-multiplex signal according to independent claim 6. Preferred embodiments thereof are respectively defined in the dependent subclaims.

According to the present invention the characteristics of the stereo-multiplex signal itself is used for the calculation of the noise power in the stereo-difference signal. The so calculated noise power is a very reliable information that can be used for the sliding stereo-mono transition, noise blanking and a de-noising of the stereo-difference signal as well as for the general indication of the signal quality of the broadcasted stereo-multiplex signal for other purposes.

The present invention and its embodiments will be better understood from a detailed description of an exemplary embodiment thereof described in conjunction with the accompanying drawings, wherein

DETAILED DESCRIPTION OF THE INVENTION

The detection of noise in the frequency demodulated broadcast signal according to the present invention is based on the fact that only the inphase component of the amplitude modulated stereo-difference signal is modulated. Therefore, the expression stereo-difference signal as heretofore and usually used describes only the inphase component of the amplitude modulated stereo-difference signal. The in quatrature component is unmodulated. By demodulating the in quadrature component of the am-carrier an estimation of the noise content of the stereo-difference signal can be calculated.

Figure 2:
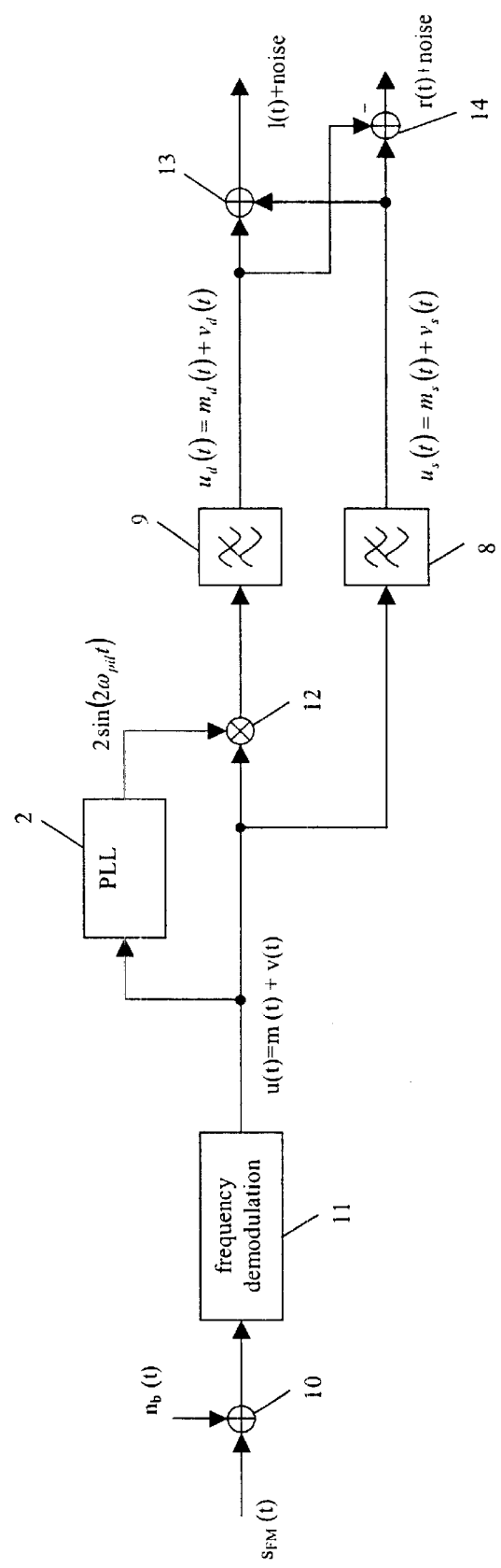
FIG. 2 shows the basic functionality of a state of the art stereo-demultiplexer.

The coherent amplitude demodulation of the inphase component of the amplitude modulated stereo-difference signal with a following lowpass filtering as shown in FIG. 2 results in:

$$u_d(t) = m_d(t) + v_d(t)$$

The coherent amplitude demodulation of the in quadrature component of the amplitude modulated stereo-difference signal with a following lowpass filtering carries no information content and therefore results in a noise signal $$u_{d,q}(t) = v_{d,q}(t)$$

It can be shown that the noise variance of the inphase component and the in quatrature component of the amplitude modulated stereo-difference signal result in the same value:

$$\sigma_{v_d}^2 = \lim_{T \to \infty} \frac{1}{2T} \int_{-T}^{T} v_d^2 \, d\tau = \sigma_{v_{d,q}}^2 = \lim_{T \to \infty} \frac{1}{2T} \int_{-T}^{T} v_{d,q}^2 \, d\tau$$

Preferrably, said variance signal $v_{d,q}^2$ is used as an indicator for the noise in the frequency demodulated broadcast signal rather than using the noise signal $v_{d,q}(t)$ itself.

Figure 1:
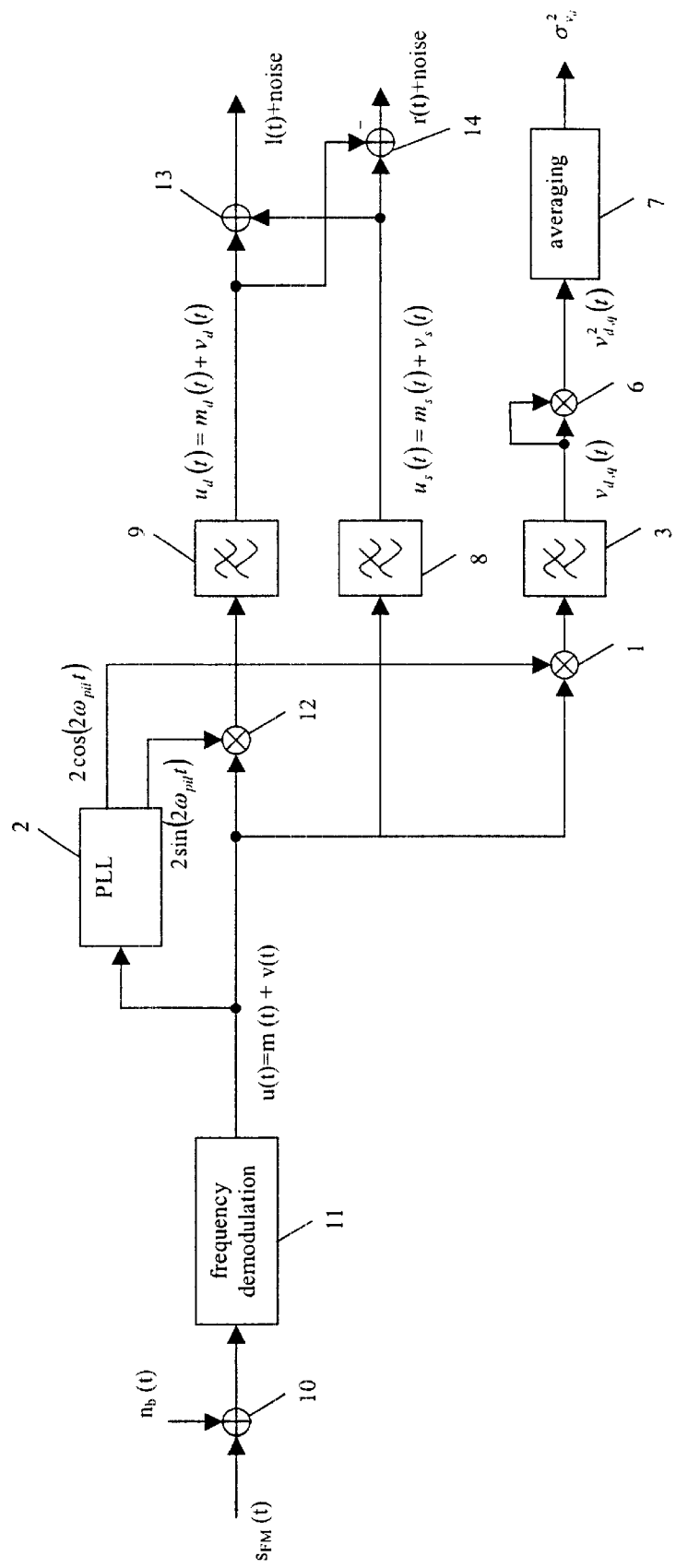
FIG. 1 shows a block diagram of a stereo-demultiplexer and a noise indication circuit according to one preferred embodiment of the present invention.

FIG. 1 shows the realization of the algorithm for the calculation of the variance of the noise in the stereo-difference signal $\sigma_{v_{d,q}}^2$ namely the demodulation of the in quadature component of the am carrier with a demodulator 1 and a squaring of the so generated noise signal by a multiplier 6 to generate the variance signal $\sigma_{v_{d,q}}^2$ by averaging the squared noise signal $v_{d,q}^2(t)$ with an averaging circuit 7.

The demodulator 1 receives the frequency demodulated stereo-mulitplex signal u(t) that includes a noise component v(t), performs a coherent amplitude demodulation thereof with the second harmonic of the pilot carrier that is locked in quadrature to the pilot carrier, i.e. a signal $2 \cdot \cos(2\omega_{pil} t)$, to gain the in quadrature component $u_{d,q}(t)$ of the amplitude modulated stereo-difference signal by a lowpass filtering with a lowpass filter 3 that is connected directly to the output of the demodulator 1. As mentioned above, the in quadrature component $u_{d,q}(t)$ of the amplitude modulated stereo-difference signal only consists of a noise component $v_{d,q}(t)$.

The second harmonic of the pilot carrier that is locked in quadrature to the pilot carrier is generated by the PLL circuit that also generates the second harmonic of the pilot carrier that is locked in phase to the pilot carrier.

Preferably, the variance signal $\sigma_{v_{d,q}}^2$ is used as a direct measure for the quality of the received signal.

Depending on the transmitter and receiver quality crosstalk distortions between the inphase component and the in quadrature component of the amplitude modulated stereo-difference signal are possible. This results in a higher value of the calculated noise variance of the stereo-difference signal than the actual noise variance is. In case of high crosstalk (very bad transmitter/receiver) the calculated variance of the noise is only absolutely reliable for an unmodulated stereo-difference signal.

In the following it will be shown how the crosstalk between the in phase component and the in quadrature component of the amplitude modulated stereo difference signal can be reduced.

The crosstalk from the in phase component to the in quadrature component is depending on the amplitude and phase distortions of the frequency demodulated stereo multiplex signal.

Phase distortions of the stereo difference signal can be minimized by using a linear phase frequency demodulator. A linear phase frequency demodulator can be realized in a digital solution for example using the CORDIC algorithm.

According to Kammeyer, Nachrichtentechnik, ISBN 3-519-16142-7, amplitude distortions of the frequency demodulated stereo mutliplex signal are caused in the receiver mainly by the combination of the frequency demodulator and the IF-filter. In case of an ideal frequency demodulator, the amplitude transfer function of the combination of the frequency demodulator and the IF-filter is decreasing with increasing frequency and is depending on the transfer function of the IF-filter and the frequency deviation of the frequency modulated stereo multiplex signal. The amplitude transfer function of the combination of the frequency demodulator and the IF-filter can be equalized using a highpass filter.

However, no optimal equalization for all modulating signals can be found due to the dependency of the amplitude transfer function on the frequency deviation of the frequency modulated stereo multiplex signal. A compromise equalization of the transfer function results in amplitude distortions of the frequency demodulated stereo multiplex signal which causes amplitude differences of the lower sideband and the upper sideband of the amplitude modulated stereo difference signal. The amplitude differences result in crosstalk from the in phase component to the in quadrature component of the amplitude modulated stereo difference signal.

Therefore, according to the teaching of the present invention, the crosstalk between in phase component and in quadrature component can be minimized by minimizing the amplitude differences between the lower sideband and the upper sideband of the amplitude modulated stereo difference signal. The amplitude difference between the lower sideband and the upper sideband of the amplitude modulated stereo difference signal is increasing with increasing frequency of the stereo difference signal, i.e. with increasing frequency of the stereo difference signal the frequency distance from the lower sideband to the upper sideband increases, and therefore the amplitude error of the compromise equalization increases.

Therefore, according to the present invention, the crosstalk between in phase and in quadrature signal can be minimized by a reduction of the bandwidth of the amplitude demodulated in quadrature component, preferrably by a reduction of the bandwidth of the lowpass filter 3.

Additionally, fm-receivers with lower performance should realize a stereo to mono blending depending on the noise variance calculated according to the present invention and the calculated variance of the stereo-difference signal.

In case of a mono transmitted broadcast program, for example spoken texts like news, the stereo-difference signal is unmodulated. So the variance of the noise power calculated according to the present invention is in any case correct and the stereo-mono blending can be calculated correctly.

In case of the reception of a music program, the stereo-difference signal contains information. Therefore, fm-receivers with bad quality (crosstalk between inphase and in quadrature component) might calculate a higher noise variance of the stereo-difference signal than the actual noise variance is. In case of a music programs noise is covered by the music signal (psycho acoustic effect) and therefore an absolutely correct calculation of the noise variance is not required.

Therefore, the algorithm and device to calculate a signal proportional to the noise included in a frequency-demodulated fm-audio broadcast signal provide a qualitatively reliable measure.

What is claimed is:

1. Method for generating a noise signal ($v_{d,q}(t)$) that is proportional to a noise which is included in an audio signal transmitted as a frequency modulated stereo multiplex signal ($S_{FM}(t)$), said frequency modulated stereo multiplex signal ($S_{FM}(t)$) comprising at least a stereo difference signal, characterized by the steps of:

amplitude modulating said stereo difference signal to obtain at least an in quadrature component ($u_{d,q}(t)$); and demodulating said in quadrature component ($u_{d,q}(t)$) of the amplitude modulated stereo difference signal to generate said noise signal ($v_{d,q}(t)$).

2. Method according to claim 1,
wherein said stereo multiplex signal ($S_{FM}(t)$) comprises a pilot carrier having a second harmonic, and
wherein said in quadrature component ($u_{d,q}(t)$) of the amplitude modulated stereo-difference signal is generated by a coherent amplitude demodulation of the frequency demodulated stereo-multiplex signal (u(t)) with the second harmonic of the pilot carrier that is in quadrature to the pilot carrier.

3. Method according to claim 1,
wherein said difference stereo signal has a bandwidth, and
which comprises the additional step of lowpass filtering said demodulated in quadrature component ($u_{d,q}(t)$) with a bandwidth that is smaller than said bandwidth of said stereo difference signal.

4. Method according to claim 1, comprising the additional step of
squaring said noise signal ($v_{d,q}(t)$) to obtain a squared noise signal $v^2_{d,q}(t)$.

5. Method according to claim 4, comprising the additional step of
averaging said squared noise signal $v^2_{d,q}(t)$ to generate a variance signal $\sigma^2_{vd,q}$ of said noise included in the audio signal.

6. Stereo-demultiplexer, characterized by
a PLL-circuit (2) that generates an in quadrature component of a second harmonic of a pilot carrier ($2\cos(2\omega_{pil}t)$) of a stereo multiplex signal ($S_{FM}(t)$), and
a noise indication circuit (1, 3, 6, 7) receiving said in quadrature component of said second harmonic of the pilot carrier ($2\cos(2\omega_{pil}t)$) and a frequency demodulated stereo-multiplex signal (u(t)) to calculate a noise signal ($v_{d,q}(t)$).

7. Noise indication circuit that generates a noise signal ($v_{d,q}(t)$) that is proportional to a noise which is included in an audio signal transmitted as a frequency modulated stereo multiplex signal ($S_{FM}(t)$),
wherein said stereo multiplex signal ($S_{FM}(t)$) comprises a pilot carrier having a second harmonic, and
wherein a first multiplier (1) is comprised for receiving a frequency demodulated stereo-multiplex signal (u(t)) and said second harmonic of said pilot carrier that is in quadrature to said pilot carrier to generate said noise signal ($v_{d,q}(t)$) as an output signal by multiplying both received signals.

8. Noise indication circuit according to claim 7,
wherein said frequency modulated stereo multiplex signal ($S_{FM}(t)$) comprises at least a stereo difference signal having a bandwidth, and
wherein a lowpass filter (3) is comprised having a bandwidth smaller than said bandwidth of said stereo difference signal for receiving said output signal of said first multiplier (1) and for outputting said noise signal ($v_{d,q}(t)$).

9. Noise indication circuit according to claim 7, characterized by
a second multiplier (6) which is adapted to square said noise signal ($v_{d,q}(t)$) to obtain a squared noise signal $v^2_{d,q}(t)$.

10. Noise indication circuit according to claim 9,
an averaging circuit (7) which is adapted to average said squared noise signal $v^2_{d,q}(t)$ to generate a variance signal that is proportional to a variance signal $\sigma^2_{vd}$ of said noise included in said audio signal.

* * * * *